United States Patent [19]
Thompson

[11] 3,814,058
[45] June 4, 1974

[54] PET BED

[76] Inventor: Milo L. Thompson, 4812 Adams St., Lincoln, Nebr. 68504

[22] Filed: Apr. 3, 1973

[21] Appl. No.: 347,482

[52] U.S. Cl. ................................... 119/19, 5/362
[51] Int. Cl. ........................................ A01k 1/02
[58] Field of Search .......... 119/1, 17, 18, 19; 5/113, 5/163, 329, 330, 362; 135/3, 4, 5.1

[56] References Cited
UNITED STATES PATENTS

| 20,097 | 4/1858 | Sneers | 5/362 |
|---|---|---|---|
| 468,455 | 2/1892 | Geissmann | 5/362 X |
| 609,553 | 8/1898 | Lloyd | 5/113 X |
| 689,168 | 12/1901 | Conroy | 119/19 |
| 2,357,056 | 8/1944 | Nelson | 5/113 X |
| 2,993,216 | 7/1961 | Casey | 5/362 |
| 3,043,264 | 7/1962 | Felhofer et al. | 119/19 |
| 3,043,264 | 7/1962 | Felhofer et al. | 119/19 |
| 3,071,782 | 1/1963 | Ball | 5/362 X |

*Primary Examiner*—Robert Peshock
*Assistant Examiner*—James A. Oliff
*Attorney, Agent, or Firm*—Clarence A. O'Brien; Harvey B. Jacobson

[57] ABSTRACT

A pet bed having a framework connected to a base and partially enclosed by a cover. Connectors retain the legs of U-shaped members of the framework in holes provided in the base. The legs of the U-shaped members extend through the holes in the base and through eyelets, grommets, and the like, in one side of a rectangular periphery of a planar strip forming the cover to retain the U-shaped members and cover on the base. Each end of the cover has further eyelets arranged to receive a leg of associated U-shaped members cooperating to define an animal ingress and egress opening. A draw-string and a shank button assembly close the cover about the upper, or bight, portion of the framework.

8 Claims, 5 Drawing Figures

PATENTED JUN 4 1974 3,814,058

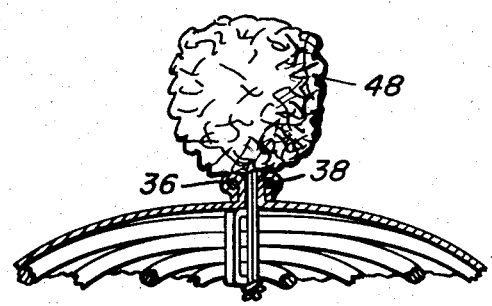
Fig. 2
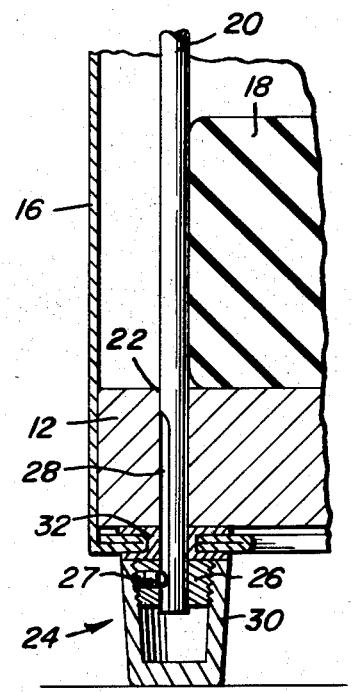
Fig. 5
Fig. 3
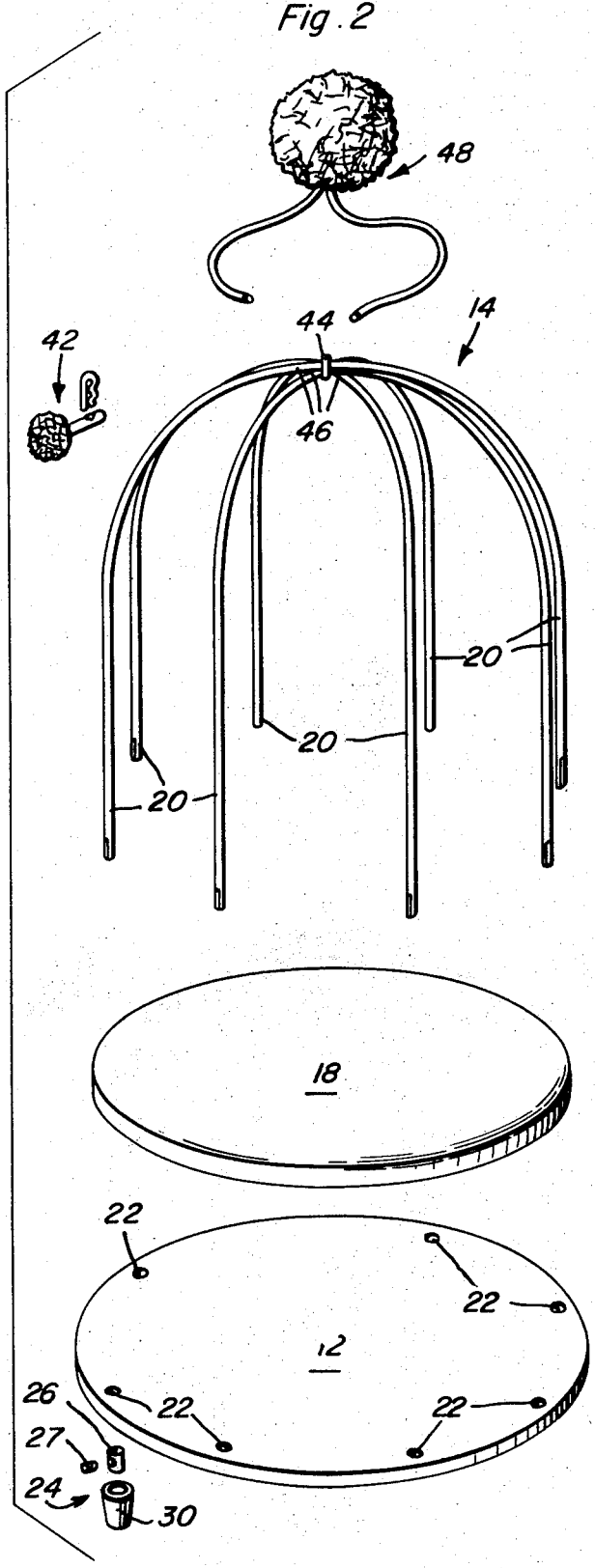

3,814,058

PET BED

BACKGROUND OF THE INVENTION

1. Field of the Invention

This invention relates generally to an enclosure, and particularly to a covered bed for pets.

2. Description of the Prior Art

It is known to furnish house pets, and the like, with a bed providing the animal with warmth and privacy. An example of such a bed is shown in U.S. Pat. No. 2,032,248. This prior art pet bed, however, requires specially constructed components, with resulting prohibitive cost. Further, the manner of its construction is unsuited for adaption to accommodate larger animals, such as a large dog.

Yet another disadvantage of the prior art pet bed referred to above is that its construction makes it difficult to perform necessary cleaning operations.

SUMMARY OF THE INVENTION

It is an object of the present invention to provide a pet bed of simple, easily assembled construction.

It is another object of the present invention to provide a pet bed that can be made in any desired size.

It is yet another object of the present invention to provide a pet bed that is easily cleaned.

It is still another object of the present invention to provide a pet bed constructed from readily available, standard components.

These and other objects are achieved according to the present invention by providing a pet bed having: a base; a framework connected to the base; and a cover arranged about the framework for partially enclosing same.

According to a preferred embodiment of the present invention, the base is in the form of a disc having a plurality of holes arranged about its periphery, and the framework includes a plurality of U-shaped members each having a pair of legs arranged in respective ones of the holes in the base. Connectors are provided for retaining the legs of the U-shaped members in the base. These connectors advantageously have an inner fastener clamped to an associated flat portion of the leg, and an outer part mounted on the inner fastener and arranged for forming a supporting foot for the base.

The cover is preferably constructed from a planar strip of material, such as a fabric, having a rectangular periphery and provided with a plurality of openings formed by eyelets, grommets, and the like, arranged spaced along a side of the periphery of the strip for receiving the legs of the U-shaped members. The side of the strip having these openings is arranged between the base and the connectors for being retained on the U-shaped members adjacent the base.

The cover strip is also provided with pairs of openings, again advantageously formed by eyelets, grommets, and the like, arranged spaced along the strip ends. These pairs of openings receive adjacent legs of U-shaped members for forming an ingress and egress access opening through the framework and cover. A hem is arranged along the side of the strip spaced from and parallel to the side provided with the eyelet openings for receiving a drawstring to close the cover about the framework. A shank button assembly, and the like, may be arranged between the access opening and the drawstring for attaching the strip ends to one another.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is an exploded, perspective view showing some of the parts of the pet bed of FIG. 1.

FIG. 3 is a fragmentary, vertical sectional view showing a detail of the pet bed of FIGS. 1 and 2.

FIG. 5 is a fragmentary, vertical sectional view showing another detail of the pet bed of FIGS. 1 to 4.

DESCRIPTION OF THE PREFERRED EMBODIMENTS

Figure 1:
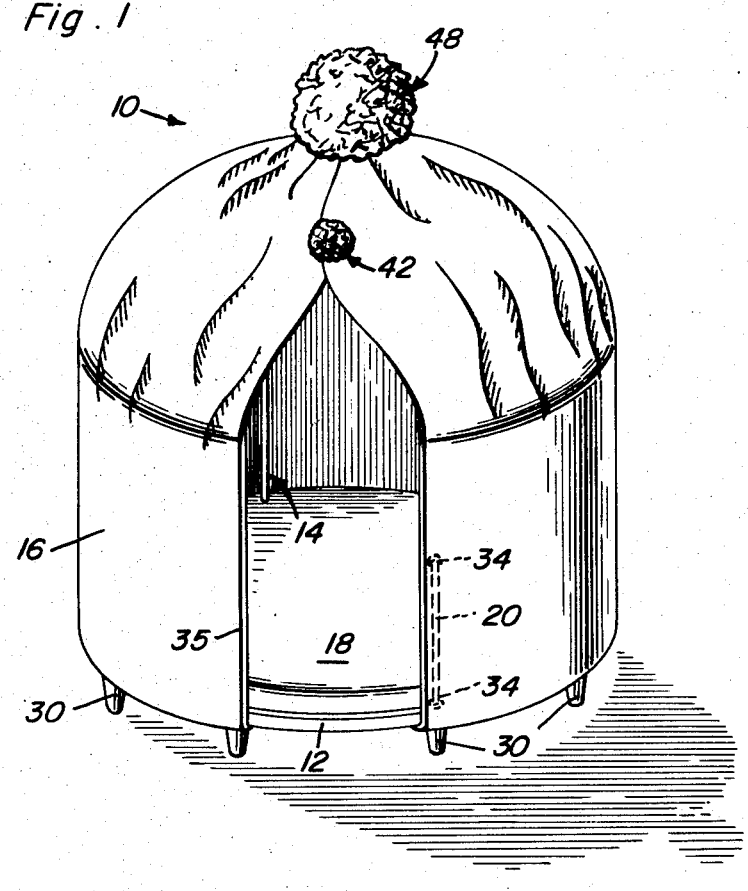
FIG. 1 is a perspective view showing a pet bed according to the present invention.

FIGS. 1 and 2 of the drawings show a pet bed 10 according to the present invention having a base 12 associated with a framework 14 partially enclosed by a cover 16 arranged about it. A cushion 18, which may be constructed in a conventional manner from foamed polyurethane, kapok, and the like, covered with, for example, sailcloth or an equally heavy, known material. This cushion 18 is simply arranged in the finished bed 10 as can be readily appreciated from FIG. 1.

A plurality of U-shaped wire members having legs 20 form framework 14. Legs 20 are arranged to be received in respective ones of holes 22 provided in base 12. Connectors 24 are provided for retaining legs 20 in holes 22, and thus connect the U-shaped members to base 12. Each connector 24 has an inner fastener 26 in the form of an annulus provided with a threaded transverse bore arranged for receiving a setscrew 27 which retainingly engages a flat surface 28 (FIG. 3) provided at the ends of legs 20 for clamping fastener 26 to the leg 20 and preventing same from passing through the hole 22 associated therewith. An outer part 30 of connector 24 is provided with internal screw threads which engage with external threads provided on fastener 26 to form a unit with the latter. Parts 30 are advantageously constructed from a, for example, suitable, known synthetic material so as to form supporting feet for base 12.

Figure 4:
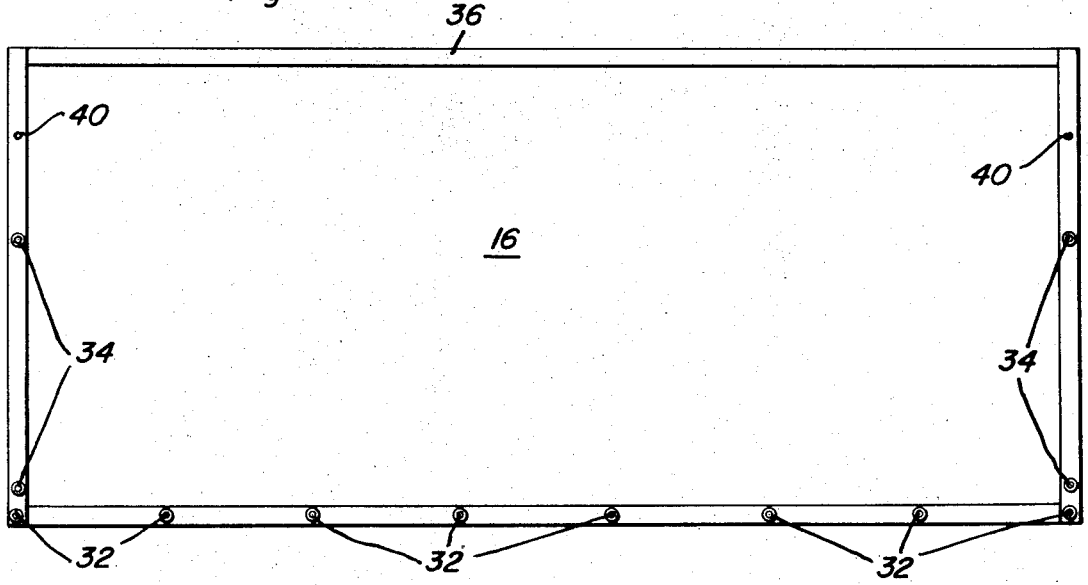
FIG. 4 is a bottom plan view showing a cover for the pet bed of FIGS. 1 to 3.

Referring now to FIGS. 3 and 4 of the drawings, cover 16 is advantageously constructed from a planar strip of a suitable material, such as a fabric or synthetic sheet, and has a rectangular periphery. The edges of this planar strip are formed into hems, best seen in FIG. 4 of the drawings, in a suitable manner, such as by sewing. A plurality of eyelets 32 form openings along one side of the periphery of the planar strip. These eyelet-formed openings are arranged for receiving legs 20 and being retained between base 12 and connectors 24, as can best be seen from FIG. 3 of the drawings. Cover 16 is also provided with pairs of opening forming eyelets 34 arranged spaced along ends of the planar strip. These eyelets 34 are arranged for receiving adjacent legs 20 arranged for forming an access opening 35 (FIG. 1) permitting animal ingress and egress to pet bed 10. As can be appreciated from FIG. 1 of the drawing, the legs 20 forming opening 35 will pass into uppermost eyelet 34, run within the associated hem, and pass out of the hem at the lower eyelet 34. Hem 36, arranged along the side of cover 16 spaced from and parallel to the side provided with eyelets 32, is arranged for receiving a drawstring 38 (FIG. 5) suitable for closing cover 16 about framework 14. Perforations 40 are also provided along the end hems of cover 16 for receiving a fastening device such as shank button assembly 42 (FIGS. 1 and 2) and connecting together the edges of cover 16 between hem 36 and opening 35.

A wire clamp, and the like, such as a hog nose clamp, preferably ties bight portions 46 of the U-shaped members together at a point on portions 46 equidistant between legs 20.

A conventional pom-pom 48, and the like, may be tied by its associated string about the point of the U-shaped members where clamp 44 is arranged for concealing hem 36 and the tied portion of drawstring 38 (not shown) for aesthetically enhancing the appearance of pet bed 10.

Base 12 is advantageously constructed from a conventional material, such as, for example, plywood having a veneer of a suitable, known synthetic material for eliminating maintenance and increasing life expectancy of the article. A strip of the same material used for cover 16 may be attached, as by a suitable adhesive, to the periphery of base 12 in a conventional manner (not shown) and arranged centered between any two holes 22. This strip will cover the periphery of base 12 at opening 35 forming the entrance to bed 10.

If plywood having a veneer of suitable known synthetic material is deemed too expensive or not readily available and common plywood, chip board, flake board, or underlayment, and the like, is employed, a strip of the same material 2" (not shown) wide used for cover 16 may be attached as by a suitable adhesive to the top of base 12 adjoining the strip attached to the periphery of base 12 to cover the bare wood.

The U-shaped members may be constructed from pieces of mild steel welding rod, and the like. Each rod is ground slightly on the side of each end to form flat 28 against which setscrew 27 engages, and is bent to a suitable radius.

It is to be understood that although the openings have been described as formed by eyelets 32, grommets and other similar elements may be used as required to form these openings.

Any kind of medium weight fabric or sheet material may be used to construct cover 16. When forming the hems, the top and bottom seams may be sewn first, and are sewn straight through to the end edges. Eyelets 34 are attached to the outside edge of the material before the side seams are sewn so that they will be only through to the inside of the hem once the seams are sewn. The side seams are stitched only from the bottom to the top seam, so as to provide a channel for drawstring 38. Eyelets 32 are arranged in a conventional manner in the lower hem only after the bottom seam has been made so that they may go completely through the material. Perforations 40 may be punched in a conventional manner, as with an awl.

To assemble a pet bed 10 according to the present invention, first pull drawstring 38, which may be a suitable known, very strong, small diameter cord, and the like, through the top hem, with enough of the drawstring left extending beyond the ends of the hem to permit drawing and tying. Legs 20 of the U-shaped members are inserted into holes 22, pushed through base 12, and retained by application of connectors 24. At this stage only inner fasteners 26 of connectors 24 will be arranged on the ends of legs 20. The U-shaped members are advantageously arranged so that the members having the two uppermost bight portions 46 will form opening 35. Now the legs 20 which will form opening 35 are released from their associated fasteners 26, passed through eyelets 34, and reinserted through their associated holes 22 in base 12. Next, the end eyelets 32 are pulled down and around the edge of base 12, legs 20 are pushed through them, and associated fasteners 26 are reclamped on these legs 20 forming opening 35.

Shank button assembly 42 may now be passed through perforations 40 and retained in place.

Cover 16 is next pulled down around the outside of base 12, the other fasteners 26 are removed from their associated legs 20, legs 20 are passed through all of the eyelets 32, and fasteners 26 are reclamped on their associated legs 20.

Outer parts 30 of connectors 24 may now be screwed onto inner fasteners 26, and connectors 24 pressed flush against the lower surface of base 12. The top of cover 16 is now pulled up over framework 14, and drawstring 38 tightened to close the opening formed by hem 36 as much as possible and tied firmly.

Pom-pom 48 may now be attached to the bight portions 36 by passing its string through the opening formed by hem 36 and tying the string from inside the enclosure. Cushion 18 compressed to fit through opening 35 and be arranged on the upper surface of base 12 as shown in FIG. 1 of the drawings.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A bed for pets, comprising, in combination:
   a. a circular base including a plurality of holes arranged around the periphery of the base;
   b. a framework connected to the base and including a plurality of U-shaped members each having a pair of legs arranged in respective ones of the holes and crossing bight portions between the legs, the framework further including means for retaining the legs in the holes, the retaining means comprising an inner fastener clamped to an associated leg adjacent an end thereof for connecting the U-shaped member to the base by preventing each leg end from passing through the hole associated therewith, and an outer part mounted on the inner fastener and arranged for forming a supporting foot for the base; and
   c. a cover arranged about the framework for partially enclosing same.

2. A structure as defined in claim 1, wherein a clamp ties the U-shaped members together at a point on the bight portions equidistant between their legs.

3. A structure as defined in claim 1, wherein the cover is a planar strip of rectangular periphery and provided with a plurality of openings arranged spaced along a side of the periphery of the strip for receiving the legs and being retained between the base and the retaining means.

4. A structure as defined in claim 1, wherein the legs are rods, and the leg ends are each provided with a flat surface arranged for clamping engagement by the inner fastener, and wherein the inner fastener includes an annulus provided with a threaded transverse bore, a setscrew, the bore arranged for receiving the setscrew and permitting the setscrew to retainingly engage an associated flat surface for clamping the annulus to a leg and provided with an associated flat surface.

5. A structure as defined in claim 4, wherein the cover is a planar strip of rectangular periphery and provided with a plurality of openings arranged spaced along a side of the periphery of the strip for receiving the legs and being retained between the base and the retaining means.

6. A structure as defined in claim 5, wherein the strip is provided with pairs of openings arranged spaced along ends of the strip for receiving legs arranged forming an access opening through the framework and cover, a hem arranged along a side spaced from and parallel to the side provided with openings for receiving a drawstring to close the cover about the framework, and means arranged between the hem and pairs of openings for attaching the strip ends together.

7. A structure as defined in claim 6, wherein a clamp ties the U-shaped members together at a point on their bight portions equidistant between their legs.

8. A structure as defined in claim 3, wherein the strip is provided with pairs of openings arranged spaced along ends of the strip for receiving legs arranged forming an access opening through the framework and cover, a hem arranged along a side spaced from and parallel to the side provided with openings for receiving a drawstring to close the cover about the framework, and means arranged between the hem and pairs of openings for attaching the strip ends together.

* * * * *